Sept. 22, 1925.                    1,554,310
J. V. TREPELE
FOLDABLE BED STRUCTURE
Filed March 25, 1924    2 Sheets-Sheet 1
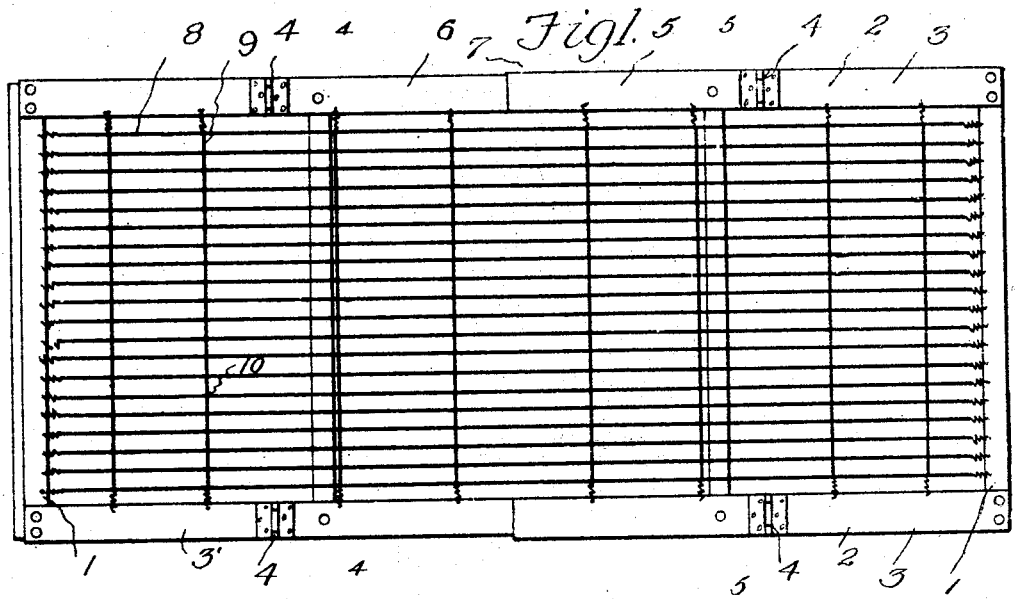
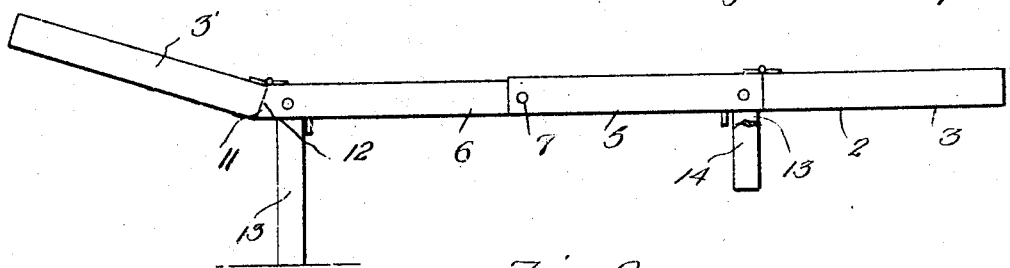
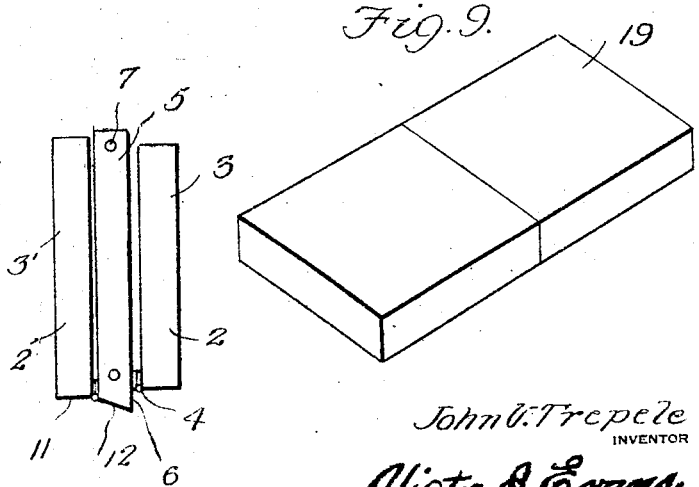
John V. Trepele
INVENTOR
Victor J. Evans
ATTORNEY Sept. 22, 1925.                                    1,554,310
                    J. V. TREPELE
              FOLDABLE BED STRUCTURE
           Filed March 25, 1924      2 Sheets-Sheet 2
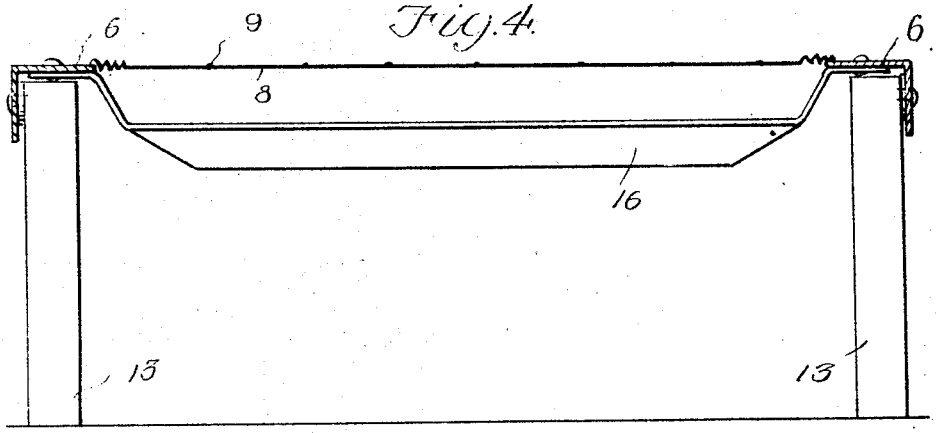
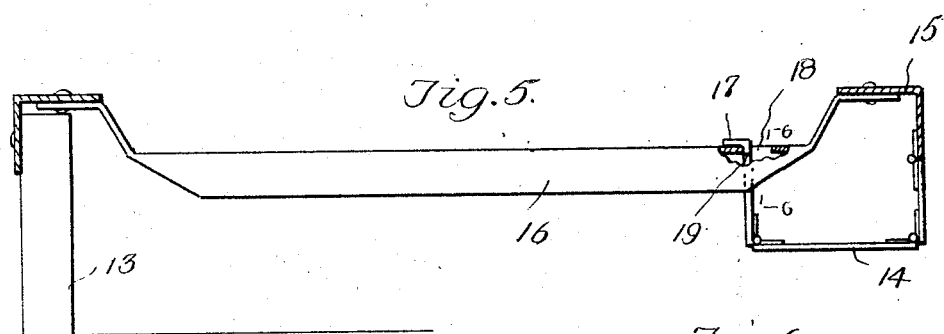
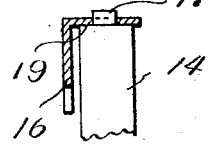
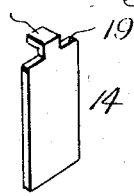
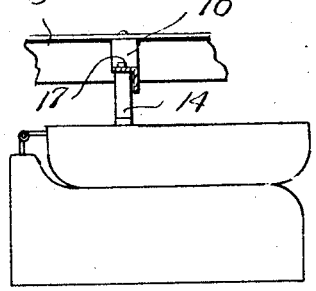
John V. Trepele
INVENTOR
BY Victor J. Evans
ATTORNEY Patented Sept. 22, 1925.

1,554,310

UNITED STATES PATENT OFFICE.

JOHN V. TREPELE, OF CHICAGO, ILLINOIS.

FOLDABLE BED STRUCTURE.

Application filed March 25, 1924. Serial No. 701,819.

*To all whom it may concern:*

Be it known that I, JOHN V. TREPELE, a citizen of the United States, residing at Chicago, in the county of Cook and State of Illinois, have invented new and useful Improvements in Foldable Bed Structures, of which the following is a specification.

This invention relates to new and useful improvements in foldable bed structures and more particularly to a device of this character which is particularly adapted for use in connection with motor vehicles. The main object of the present invention is the provision of a bed structure which includes in its formation a foldable spring frame which may be quickly and readily folded into compact formation so that the same may be conveniently stored or supported by the motor vehicle body in any suitable place and the device is especially adapted for use with motor vehicles wherein the back portion of the front seat is foldable onto the main seat portion.

Another object of the invention is the provision of a foldable spring structure which can be readily positioned within the body of a motor vehicle and extended longitudinally of the body, said spring structure being supported from the floor of the vehicle and also from the seat members within the vehicle, suitable arrangements being provided for so as to support the spring structure in a substantial horizontal plane with the exception of one end thereof which is slightly inclined to form a head piece.

A further object of the invention is the provision of a foldable structure of the above character which can be readily folded into compact formation and is so arranged that it may be readily placed between the tire carrier and the back end of the body of the vehicle and supported in any suitable manner when not in use. A suitable foldable mattress is also used in conjunction with the foldable spring structure, said mattress being adapted to be folded into a compact package so as to occupy a minimum space when not in use.

With the above and other objects in view the invention consists in the novel features in construction, the combination and arrangement of parts hereinafter more fully set forth, pointed out in the claims and shown in the accompanying drawings in which:—

Fig. 1 is a top plan view of a foldable spring structure constructed in accordance with my invention.

Fig. 2 is a side elevation.

Fig. 3 is a similar view showing the structure in a folded position.

Fig. 4 is a transverse section taken on the line 4—4 of Fig. 1.

Fig. 5 is a similar view taken on the line 5—5 of Fig. 1.

Fig. 6 is a detail section taken on the line 6—6 of Fig. 5.

Fig. 7 is a detail perspective of the outer end of the foldable leg member.

Fig. 8 is a detail section showing how the foldable leg member rests upon the down turned back of the vehicle seat.

Fig. 9 is a detail perspective view of the mattress member.

In the embodiment of my invention I provide a substantial frame member including the end pieces 1 and the longitudinal side pieces 2, said side pieces being formed in sections so that the entire frame may be folded into compact formation. The side pieces 2 are each formed of the two end sections 3, the outer ends of which are secured to the ends of the end pieces 1. The inner end of the members 3 are hingedly connected by means of the hinges 4 to the outer ends of the pivotally connected central sections 5 and 6. The section 6 has one end thereof arranged in overlapped relation with respect to the section 5 and a pivot pin 7 is extended through the flange portions of the sections 5 and 6 to pivotally connect their overlapping ends.

As illustrated in the drawings both the end pieces 1 and the side pieces 2 are formed of angle iron so that they may be readily connected together and fitted closely together when the frame is folded as shown in Fig. 3, it being apparent that the two central members 5 and 6 will readily fold one into the other.

Arranged between the side and end pieces and rigidly connected thereto are the longitudinal and transverse spring wires 8 and 9 respectively, the ends of the wires 8 being connected in any suitable manner to the end pieces 1 while the cross wires 9 are extended transversely of the frame and connected in any suitable manner to the side piece 2. Attention is directed to the fact that the longitudinal and transverse pieces 8 and 9 are connected to each other as at 10 in any suitable manner so as to prevent these pieces from individual sagging or displacement.

As shown in Fig. 2 of the drawings the end section 3' has its inner end beveled upon an incline as at 11 and adapted to abut the inclined beveled end portion of the central section 6, said inclination being indicated at 12. The inclined beveled faces 11 and 12 are provided for the purpose of supporting the section 3' in an inclined position as shown in Fig. 2 to form a substantial head rest.

In placing this foldable spring structure in position within a motor vehicle it will be apparent that certain portions of the spring structure may be readily supported by the stationary seats within the vehicle but in order to provide means for securely supporting the frame in its proper position, a pair of leg members 13 are attached to the frame at a point adjacent its forward end and these leg portions 13 are of the proper length to be rested upon the floor of the vehicle or any other suitable support adjacent thereto so as to support the frame of the spring structure in a slightly elevated position above the rear seat.

In certain makes of motor vehicles, the front seating capacity is generally composed of two separate seats one of which is folded downwardly toward the bottom of the vehicle and the other merely has a folding back portion, therefore when my improved spring structure is arranged in a vehicle body of this character one side of the spring structure will be disposed above the foldable back portion of one seat while the other side of the structure will be positioned above the stationary seat with its foldable back portion and in order to properly support the frame with respect to this stationary seat, a foldable leg member 14 is provided, the upper end of which includes an angular member 15 which is riveted or otherwise secured to the end of one of the cross braces 16. The lower end of the angular member has hingedly connected thereto a plurality of pivotally connected sections the lowermost of which is provided with an out turned tongue 17 for engagement within an opening 18 in one of the flanges of the braces 16. From this it will be readily apparent that when it is desired to support the frame above this foldable down seat, the foldable leg 14 is positioned as shown in Fig. 5 and the tongue 17 is passed through the openings 18 and engaged with the upper face of the horizontal flange of the braces 16 for supporting the leg 14 in its proper position for resting upon the foldable back of the seat as illustrated in Fig. 8.

In view of the fact that the leg members are formed of substantially angular shape it will be noted that these leg members when in folded position will rest within the side sections so as to be entirely out of the way. Attention is also directed to the fact that by forming the tongue 17 upon the lower end of the leg member 14 it provides shoulders 19 upon opposite sides of the tongue which form supports for the cross braces 16 when the tongue is engaged within the opening 18 as clearly illustrated in Fig. 5.

These brace members 16 which extend tansversely of the foldable frame are connected to the outer ends of the central sections 5 and 6 at a point adjacent the hinged connection of the sections 5 and 6 with the outer sections 3, thus providing a rigid structure for supporting a person's body in a comfortable position in a motor vehicle.

In connection with my improved foldable spring structure I provide a foldable mattress 20, said mattress being foldable at its central portion and upon opposite sides of the central portion an equal distance from the center and the ends whereby the mattress may be foldable into compact formation when not in use.

While I have shown and described the preferred form of my invention I wish it to be understood that various changes and alterations may be carried out during the manufacture of the same without departing from the spirit of the invention or the scope of the appended claims.

Having thus described my invention what I claim is:—

1. A foldable structure of the character described comprising a plurality of hingedly connected frame sections normally forming a substantially rectangular frame operatively disposed in a substantially horizontal plane, supporting legs connected to the sections at a point adjacent certain of the hinge connections one of said legs being folded longitudinally of its length and means for detachably connecting the outer end of the last leg with a portion of the frame.

2. A foldable structure of the character described including a substantially rectangular frame operatively disposed in a horizontal position, said frame comprising a plurality of hingedly connected frame sections adapted to be folded into compact form, supporting legs pivoted to the frame at a point adjacent the hinge connections one of said legs being formed in sections operatively disposed in rectangular shape, means for detachably connecting the end of the sectional leg to the frame said last leg being foldable, with the sections thereof overlying one another when not in use.

In testimony whereof I affix my signature.

JOHN V. TREPELE.